United States Patent

[11] 3,625,826

[72] Inventors Tatsuyoshi Kobayashi
RA24, No. 537, Ikejiri-machi, Setagaya-ku, Tokyo;
Takeshi Tabuchi, No. 667, Iwato, Komae-machi, Kitatamagun, Tokyo, both of Japan
[21] Appl. No. 746,343
[22] Filed July 22, 1968
[45] Patented Dec. 7, 1971

[54] PROCESS FOR PRODUCING SPICULISPORIC ACID AND RELATED SUBSTANCES THEREOF
12 Claims, 2 Drawing Figs.
[52] U.S. Cl. .................................................. 195/36 R, 195/81
[51] Int. Cl. .................................................. C12d 1/00
[50] Field of Search ........................................... 195/81, 36

[56] References Cited
OTHER REFERENCES

Birkinshaw et al., " Biochemical Journal" Vol. 28, 1934, pp. 827–836
Oxford et al., " Biochemical Journal," Vol. 28, 1934, pp. 1321–1324

*Primary Examiner*—Joseph M. Golian
*Attorney*—Otto John Munz

ABSTRACT: A process for producing spiculisporic acid and hydroxy-acid form thereof by fermentation which comprises the steps of: cultivating fungi belonging to *Penicillium spiculisporum* ATCC 16071 in a nutrient culture medium containing carbohydrate materials, nitrogen sources and inorganic salts; cultivating the said culture medium aerobically; controlling the pH value of the culture medium during fermentation at 1.2 to 2.5, and recovering from the cultured broth spiculisporic acid and hydroxy acid.

PROCESS FOR PRODUCING SPICULISPORIC ACID AND RELATED SUBSTANCES THEREOF

BACKGROUND OF THE INVENTION

1. Field of the Invention

This invention relates to improvements in a process for producing spiculisporic acid and a hydroxy-acid form thereof (3-hydroxy-3, 4-dicarboxy pentadecanoic acid). More particularly, the invention relates to a process wherein *Penicillium spiculisporum* is cultivated aerobically in a culture medium containing carbohydrate materials, nitrogen sources and inorganic salts at an acidic pH level of 1.2 to 2.5, whereby spiculisporic acid and related substances thereof are produced and accumulated in a cultured broth and the acids thus formed are separated and recovered.

For descriptive and claim purposes Spiculisporic acid and related substances thereof are defined hereinafter as follows:

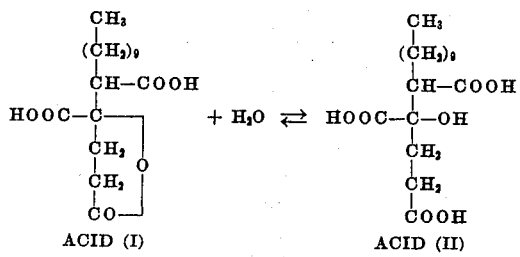

2. Description of the Prior Art

Production of spiculisporic acid by fermentation process was reported in 1932 when *Penicillium spiculisporum* was confirmed by Clutterbuck et al. Since then the same type of fungus was reported by Asano and Kameda in 1941, and *Penicillium crateriforme* was reported by Birkinshow et al. in 1934. However, according to these reports, the fungi were cultivated in Czapek-Dox's medium under slightly acidic conditions at a pH level of 3.5 to 6.0 for a period of about 3 to 5 weeks and spiculisporic acid was formed at a yield of only 0.1 g./dl. Therefore it was utterly impossible to produce the said acid industrially by means of these micro-organisms.

According to these reports the lactone type of the said acid was isolated by using organic solvent and the spiculisporic acid produced in the fermented broth was regarded as being also of the lactone type.

Examples of the prior art process for the production of spiculisporic acid by fermentation processes are for instance a process employing a cultivation of *Penicillium spiculisporum* Lehman [refer to Cutterbuck et al. Phil. Trans. Roy. Soc. Lond. B 220, 301 (1931)], *Penicillium crateriforme* Gilman and Abbott or *Penicillium Minioluteum* Dierck [refer to H. Raistrick et al., Biochem. J., 28, 828 and 1321 (1934)]. These processes, however, have a number of disadvantages. In the prior preparative methods the fermentation was conducted under slightly acidic conditions at a pH level of 3.5 to 6.0, including a long period such as about 3 to 5 weeks and spiculisporic acid was formed at a yield of only 1 mg./ml. Therefore it was impossible to produce the acid industrially by means of these micro-organisms. And further, according to these established reports the spiculisporic acid was isolated as a lactone type thereof, i.e., Acid (I), by organic solvent extraction.

SUMMARY OF THE INVENTION

The primary object of the invention is to provide an industrially profitable method for producing acid (I) and acid (II) which will have a wide range of applications as a raw material for the synthesis of surface active agents, ion-exchange resins, neutral detergents and other organic chemicals.

A second object of the invention is to provide an inexpensive and easily practicable method for producing acids (I) and (II) by a fermentation process using micro-organisms.

A third object of the invention is to provide an efficient method and safe from infectious microbe contamination for producing high yields of acids (I) and (II) by maintaining the pH of the culture medium at the fermentation stage within a low range of 1.2 to 2.5.

Another object of the invention is to provide a process for producing and accumulating acids (I) and (II) in a culture broth within a short period of time by aerobic cultivation and fermentation of fungi using such means as shaking the culture or the submerged culture.

Still another object of this invention is to provide a simple and economical process for isolating acids (I) and (II) in crystal form without using an organic solvent solely by heating and cooling the fermented broth by virtue of the relationship of equilibrium between the acids (I) and (II) and the difference of solubility of both types in water.

Other objects of this invention will be understood from the more detailed descriptions of this invention that follow.

Figure 1:
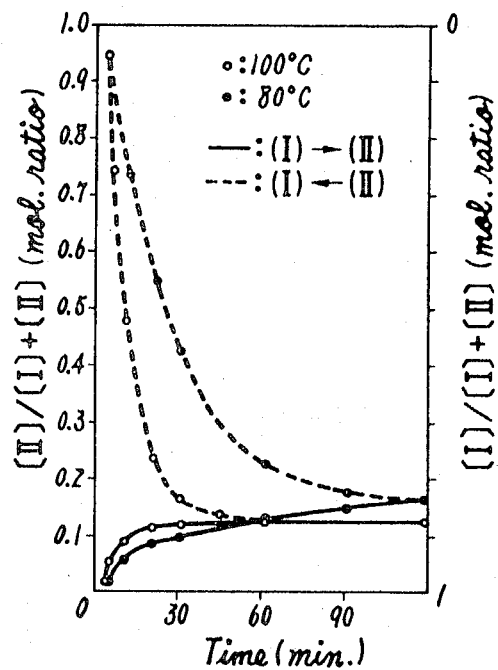
FIG. 1 is a graph showing the relationship of an equilibrium between acids (I) and (II) and the heating time at 80° C. or 100° C. in a 0.05 mol solution thereof. In the figure, transformation from Acid (I) to Acid (II) is abbreviated as (I)→(II), and Acid (II) to Acid (I) is illustrated as (II)→(I).

The present inventors cultivated aerobically a strain they isolated from the soil, having the same morphological characteristics as those of *Penicillium spiculisporum* Lehman in a culture medium containing carbohydrate materials at a low pH level of 1.2 to 2.5 and succeeded in producing a large amount of acids (I) and (II) and accumulating it in a culture broth.

The strain used in the present invention was isolated from the soil in Tokyo by the present inventors, and mycological characteristics of this strain were studied in accordance with the methods described in "A Manual of Pencillia," The Williams and Wilkins Co., 1949 by K. B. Raper and C. Thom. The results of the said study will be explained in detail as follows.

Morphological Characteristics of the Isolated Strain

Colonies on Czapek's solution agar spreading rather broadly, 55 mm. in 2 weeks at 25° C., consisting of a mycelial felt with vegetative mycelium largely submerged, with surface appearing floccose especially at central areas, in white to light cream shades, conidial structures very limited in number; exudate limited, colorless; odor pronounced, fragrant; reverse yellow in colony margins to flesh color at central areas; perithecia produced moderately, usually forming a continuous layer near the colony margin and more or less piled in central areas, commonly 100 to 400 $\mu$ in diameter, soft at all stages of development, white to dull cream in color becoming golden yellow in age, with walls consisting of thin loose networks of yellowish vegetative hyphae; perithecium bearing abundant asci in short chains; asci oval to subspherical when mature, about 7 to 10 $\mu$ in diameter, 8-spored; ascospores elliptical, spinulose over the entire surface, 3.5 to 4 $\mu$ by 2 2.5 $\mu$, colorless; penicilli variable from monoverticillate through irregular patterns to typically biverticillate symmetrical, usually borne on short conidiophores arising as branches from aerial hyphae; conidiophores commonly less than 50 $\mu$ in length by 1.8 to 2.2 $\mu$ in diameter, smooth walled; metulae lacking or few in the verticil, commonly irregularly arranged, 10 to 15 $\mu$ by 1.8 to 2.2 $\mu$; sterigmata parallel, 10 to 20 $\mu$ by 1.5 to 2.0 $\mu$, characteristically tapered; conidia elliptical, 2.5 to 3.0 $\mu$ by 1.5 to 2.0 $\mu$, thinwalled, smooth. Perithecial initials were observed on corn meal agar, and appeared as conspicuously swollen and irregularly branching sections of aerial hyphae.

The above-mentioned morphological characteristics place this organism in *Penicillium spiculisporum* Lehman as described by K. B. Raper and Thom.

Taxonomical Properties of the Isolated Strain No. 10–1

The morphological characteristics of this organism corresponded closely to the description of *Penicillium spiculisporum* Lehman given by Raper and Thom.

Colonies of *Penicillium spiculisporum* IFO No. 6440 grew restrictedly on Czapek's agar about 15 to 20 mm. in 2 weeks at 25° C., while colonies of the newly isolated strain spread more rapidly, with vegetative mycelium largely submerged in the substrutum. Other detailed morphological characteristics in connection with peritheci ascospores, penicilli and perithecial initials of both strains agreed thoroughly.

It was concluded from the above-mentioned characteristics that this newly isolated strain belongs to *Penicillium spiculisporum*.

This strain has been deposited at the American Type Culture Collection under the accession number of ATCC No. 16071.

The nutrient culture medium as used in the present invention for the purpose of cultivating the above-mentioned strain of *Penicillium spiculisporum* is composed of carbohydrate materials, nitrogen sources, inorganic salts and other nutrients, as shown in the following examples.

As the carbohydrate materials are included glucose, sucrose, fructose, molasses and starch hydrolyzates. As the nitrogen sources are included ammonium chloride, ammonium sulfate, ammonium phosphate, ammonium liquid, ammonium tartrate, sodium nitrate and urea, or corn steep liquor, peptone, yeast extract, meat extract and casein hydrolyzates.

The maximum concentration of carbohydrate materials in the culture medium applicable in the process of the present invention is 30 percent but at more than 20 percent the yield of the said acid is somewhat reduced and ethyl alcohol is produced as a byproduct. Concentration of nitrogen sources in the range of 0.02 to 0.5 g. per litre of the culture medium (in terms of nitrogen) does not affect the yield of the product. Inorganic salts, such as acidic potassium phosphate, magnesium sulfate, ferrous sulfate and zinc sulfate, are also added to the nutrient culture medium in suitable amounts.

The pH level of the culture medium may be left unadjusted but preferably it should be adjusted to a range of 3.0 to 7.0.

As the above-mentioned strain is innoculated and cultivated in the culture medium, the pH level will decrease gradually. When nitrogen sources, such as ammonium chloride, ammonium sulfate and ammonium phosphate, which liberate acid ions in the culture broth, are used, the pH level during the fermentation period will decrease of itself to 2.5 or below. However, the pH level may be adjusted properly by adding mineral acid and/or acids such as hydrochloric acid, phosphoric acid, sulfuric acid and the like. On the other hand, when nitrogen sources, such as sodium nitrate, ammonium nitrate and urea, which liberate alkali ions in the culture broth, are used, the pH level during the fermentation period should be adjusted to 2.5 or below by adding mineral acids such as mentioned above.

The optimum range of pH preferred for the production of acids (I) and (II) by this strain is 1.5 to 2.0, and it is possible to produce the said acids even at a lower level of 1.2. The following table is an example of the cultivation of the isolated strain of *Penicillium spiculisporum* at various pH values during the fermentation period.

The culture medium used consisted of 18 g./dl. of glucose, 0.2 ml./dl. of corn steep liquor, 0.1 g./dl. of monopotassium phosphate ($KH_2PO_4$), and 20 mg./dl. of magnesium sulfate ($MgSO_4 \cdot 7b0 2O$). 100 ml. of this nutrient culture medium in a 500-ml. flask was cultivated with shaking at 30° C. for 5 days.

| Nitrogen sources | Amount (mg./dl.) | Addition of 1 N HCl (ml.) | pH at fermentation stage | Acids (I) and (II)* (mg./ml.) |
|---|---|---|---|---|
| NaNO₃ | 120 | 0 | 3.3 | 13.6 |
| | | 0.5 | 2.2 | 30.2 |
| | | 1.5 | 1.7 | 40.5 |
| Urea | 90 | 0 | 2.6 | 12.9 |
| | | 0.5 | 2.1 | 19.3 |
| | | 1.0 | 1.8 | 28.5 |
| NH₄Cl | 80 | 0 | 2.5 | 33.5 |
| | | 0.5 | 2.0 | 38.9 |
| | | 1.0 | 1.5 | 46.1 |

*Calculated from titrable acidity.

It is apparent from the above table that the pH level in the culture broth at the fermentation stage of culturing fungi has very great effects on the yield of the product.

The above strain of *Penicillium spiculisporum* as used in the present invention is cultivated aerobically at 25° C. to 40° C., preferably at 30° C. to 35° C., for a period of 3 to 6 days. An insufficiently aerobic condition results in a decrease in the yield of acids (I) and (II), producing ethyl alcohol as a byproduct. This phenomenon is observed conspicuously when the concentration of carbohydrate materials is high. If a pH of the culture medium is controlled at low acid pH, the product is formed usually as an insoluble free acid, represented by the Acid (II), and thence the product is suspended and separated out in the culture broth as a crystalline form. Addition of non-sterilized carbohydrate materials to the culture broth does not cause infectious microbe contamination because the pH value in the broth is maintained very low. This lack of infectious microbe contamination should prove of a great advantage in an industrial application of the present invention.

Spiculisporic acid is formed as the insoluble free acid in the culture broth, as will be described later, when a low pH level is maintained and separates out in crystal form as the acid is produced.

This is another advantage of the present invention, because generally in the fermentation of organic acid, production of organic acid and/or fungal growth are inhibited in proportion to the accumulation of the product in the culture broth. According to the present invention, the pH level in the culture broth does not decrease so much as to interfere with the growth of the fungi or the production of the product and as the result the rate of fermentation does not decrease.

Figure 2:
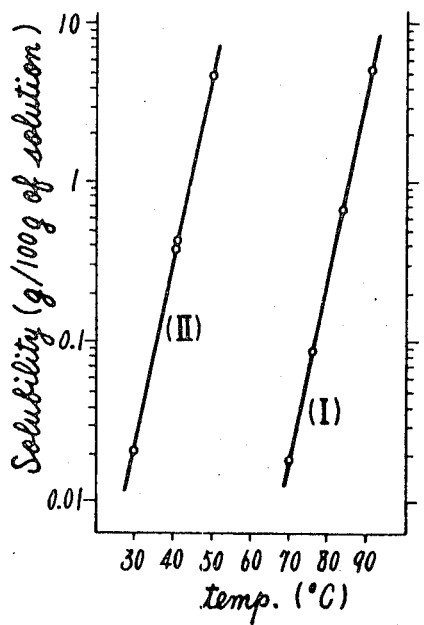
FIG. 2 is a logarithmic graph showing the solubility-temperature curves of the acids (I) and (II).

Spiculisporic acid, defined hereinbefore as Acid (I), and hydroxy-acid form of spiculisporic acid, defined hereinbefore as Acid (II), are equilibrated in an aqueous solution as shown below:

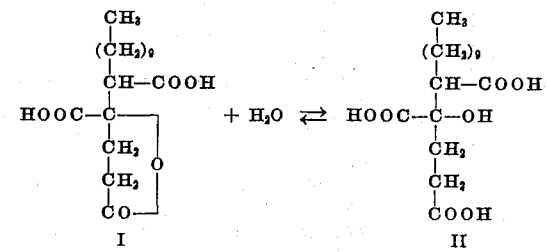

wherein (I) and (II) represent Acid (I) or spiculisporic acid and Acid (II) or hydroxy-acid form of spiculisporic acid, and these equilibrium relationship at several conditions are illustrated in FIGS. 1 and 2. FIG. 1 shows the relationship, being in equilibrium established between the hydroxy-acid form of spiculisporic acid, 3-hydroxy-3, 4-dicarboxy pentadecanoic acid, and spiculisporic acid itself in a 0.05 mol solution of the said acid illustrating the heating time at 80° C. and 100° C., required for establishing the equilibrium.

The logarithms of solubilities of the hydroxy-acid form of spiculisporic acid and the spiculisporic acid itself are plotted with temperatures as shown in FIG. 2.

From the FIG. 1, it can be seen that 1-hour heating at 100° C. or 2 hours heating at 80° C. is needed for establishing the equilibrium between these two forms.

Furthermore, heating the acid for 1 hour in water at 100° C. leads to the equilibrium composition in which 87 percent of spiculisporic acid and 13 percent of the hydroxy-acid form thereof are present (refer to FIG. 1), and the solubility of the spiculisporic acid, i.e., Acid (I), decreases down to 0.02 percent to 70° C., in spite of the fact that the solubility of the hydroxy-acid form of spiculisporic acid, i.e., Acid (II), increases up to almost 100 percent at the same temperature.

The above-mentioned characteristics of the acid (I) and the acid (II) can be used conveniently to separate the mycelia from the fermentation liquor. Since the solubility of the Acid (II) increases rapidly depending on the increase of temperature, the final fermentation liquor containing the suspended crystals of the acid (II) may preferably be heated to about 50–80° C. for a short time to solubilize the acid completely and mycelia are removed. The thus filtered broth is heated to about 70–100° C. preferably at least for about 1 hour to make a conversion from Acid (II) to Acid (I). The resulting Acid (I) has an extremely low solubility at the temperatures shown in FIG. 2, and therefore crystals of Acid (I) can be obtained easily. In this manner the crystallized spiculisporic acid, i.e., Acid (I), can safely be separated from its hydroxy-acid form, i.e., Acid (II), by means of heating and the repeated heating and cooling will promise good yield of Acid (I). Another conventional method to solubilize the Acid (II) provides the steps of adding alkaline solution into a fermentation liquor to form alkaline salt of Acid (II), of removing mycelia thereafter and subsequently of heating and adding mineral acid for isolation of Acid (I).

Examples of this invention will be given in the following only by way of illustration and therefore are not intended to limit the present invention.

EXAMPLE 1

One hundred milliliters of an aqueous medium comprising glucose 13%, $NH_4Cl$ 0.08%, $KH_2PO_4$ 0.05%, $MgSO_4 \cdot 7H_2O$ 0.05% and $FeSO_4$ 0.005% (pH not adjusted) were introduced into a 500 ml. shade flask, sterilized prior to use, inoculated with the newly discovered *Penicillium spiculisporum* Lehman strain and then shake cultured at 30° C. for 4 days. Two milliliters of this preculture broth was inoculated in a 100 ml. culture medium in 500 ml. Sakaguchi flask containing the same ingredients hereinabove and reciprocally shake cultured at 30° C. for 5 days and the amount of acid produced was 39.8 mg./ml. One hundred milliliters of the fermented liquid was heated to 70° C. and maintained at this temperature for 10 minutes to dissolve the crystals of the said acid, and after separating the mycelia, the filtrate was further heated to 80° C. to 85° C. for 1 hour. The crystals of the acid (I) were subsequently fractionated and, after washing and drying, 3.5 g. of crystals of the lactone-type acid were obtained.

EXAMPLE 2

The glucose in example 1 was replaced by sucrose to produce Acid (I). Final pH of the fermentation was 1.8, and 41.6 mg./ml. of Acid (II) was observed by titration.

EXAMPLE 3

The glucose in example 1 was replaced by fructose to produce Acid (I). Final pH of the fermentation was 2.1 and 38.9 mg./ml. of Acid (II) was observed by titration.

EXAMPLE 4

Cultivation was carried out in the culture medium of example 1 in the same manner as in example 1, except that nitrogen sources were used and 1 N mineral acid was added as follows. The amount of acid (II) was determined by titration as shown in the following.

| nitrogen sources | g./l. | Amount of 1N mineral acid added (ml./100 ml.) | Acid (II) |
| --- | --- | --- | --- |
| $NH_4NO_3$ | 0.6 | HCl, 0.5* | 30.2 |
| $NaNO_3$ | 1.2 | HCl, 1.5*** | 40.5 |
| Urea | 0.9 | HCl, 1.0* | 43.8 |
| C.S.L.** | 1.0 | | 41.0 |
| $NH_4Cl$ | 0.2 | | 46.1 |
| $(NH_4)_2SO_4$ | 0.12 | | 43.0 |
| $(NH_4)_3PO_4$ | 0.2 | | 47.0 |
| $NaNO_3$ | 1.2 | HCl, 1.5* | 39.8 |
| $NaNO_3$ | 1.2 | $H_2SO_4$, 1.5* | 38.9 |
| $NaNO_3$ | 1.2 | $H_3PO_4$, 1.5* | 38.2 |

*1N mineral acid was added before sterilizing.

**C.S.L. = Corn steep liquor.

***Total amount of 1N mineral acid was added during the fermentation stage.

EXAMPLE 5

One hundred milliliters of an aqueous medium comprising glucose 9%, $NH_4Cl$ 0.08%, $KH_2PO_4$ 0.05%, $MgSO_4 \cdot 7H_2O$ 0.05%, $FeSO_4 \cdot 7H_2O$ 0.005% and corn steep liquor 0.1 ml./dl. (pH not adjusted) were introduced into a 500 ml. shake flask, sterilized prior to use, inoculated with the new *Penicillium spiculisporum* Lehman strain and then shake-cultured at 30° C. for 4 days. Two milliliters of this preculture broth was inoculated in a 100 ml. culture medium in 500 ml. Sakaguchi flask containing the same medium hereinabove. After 3 days of cultivation 10 g. of crystal glucose was added to the broth and after 5 and 7 days of cultivation additional 10 g. of glucose was added each time. The pH of the fermentation liquor was indicated at 1.8 after 11 days, and thence the broth was heated to 70° C. for 10 minutes. After mycelia were removed, the filtrate was heated to 80°–85° C. for 1 hour. The precipitated crystal was separated out and followed by washing and drying. Yield of Acid (I) : 10.5 g.

EXAMPLE 6

One hundred forty liters of culture medium comprising the same as in example 1 were introduced into a 200 l. fermentation tank. After sterilization, 2 litres of the preculture broth prepared in the same manner as in example 1 were inoculated in this culture medium and were cultured with agitation at 140 r.p.m., aeration of 16 l./ml. at 30°C. for 5 days. 1.5 kg. of sodium hydroxide were added in he fermented liquid. 500 g. of diatomaceous earth were added and the mycelia were separated. The filtrate was heated to 90° C. and sulfuric acid in an equimolar weight corresponding to the amount of addition of sodium hydroxide was added with stirring. After stirring, the filtrate was left to stand overnight. The crystals thus precipitated were separated centrifugally and, after washing and drying, 4.4 kg. of the lactone-type acid (II) was obtained.

We claim:

1. A process for producing spiculisporic acid and hydroxy-acid form thereof by fermentation which comprises the steps of: cultivating fungi belonging to *Penicillium spiculisporum* ATCC 16071 in a nutrient culture medium containing carbohydrate materials, nitrogen sources and inorganic salts; cultivating the said culture medium aerobically; controlling the pH value of the culture medium during fermentation at 1.2 to 2.5, and recovering from the cultured broth spiculisporic acid and hydroxy acid.

2. A process for producing spiculisporic acid and hydroxy-acid form thereof by fermentation which comprises the steps of: cultivating fungi belonging to *Penicillium spiculisporum* ATCC 16071 in a nutrient culture medium containing carbohydrate materials, nitrogen sources and inorganic salts; cultivating the said culture medium aerobically; controlling the pH value of the culture broth at a low level of 1.2 to 2.5 by adding mineral acids to the said culture medium during fermentation, and isolating from the cultured broth spiculisporic acid and hydroxy acid.

3. A process for producing spiculisporic acid and hydroxy-acid form thereof by fermentation which comprises the steps of: cultivating fungi belonging to *Penicillium spiculisporum* ATCC 16071 in a nutrient culture medium containing carbohydrate materials, nitrogen sources, inorganic salts and mineral acids; cultivating the said culture medium aerobically; controlling the pH value of the culture medium during the fermentation at 1.2 to 2.5; heating the said cultured broth to 70°–90 C. for a short time, removing the mycelia, subsequently heating the broth to 70°–100° C. for about 1 hour; cooling the broth thereafter and isolating from the cultured broth spiculisporic acid.

4. A process according to claim 1, which comprises the step of adding nitrogen materials which liberate acid ions in the cultured broth during cultivation.

5. A process according to claim 2 which comprises the step of adding nitrogen materials which give alkali ions in the culture broth during cultivation.

6. A process according to claim 1, which comprises the step of adding carbohydrate materials selected from a group consisting of glucose, fructose, surcrose, molasses and starch hydrolyzates.

7. A process according to claim 1, which comprises the step of adding carbohydrate materials during cultivation.

8. A process for producing spiculisporic acid and hydroxy-acid form thereof by fermentation which comprises the steps of: cultivating fungi belonging to *Penicillium spiculisporum* ATCC 16071 in a nutrient culture medium containing carbohydrate materials, nitrogen sources, inorganic slats salts and mineral acids; cultivating the said culture medium in an aerobic condition and at a low pH level of 1.2 to 2.5 during fermenting; adding to the said cultured broth an alkaline material; removing the mycelia; subsequently heating the broth to about 80°–100° C. for at least one hour; cooling said broth thereafter, and adding an equimolar amount of mineral acid, and thus isolating spiculisporic acid.

9. A process according to claim 3, which comprises the steps of adding mineral acids selected from the group consisting of hydrochloric acid, sulfuric acid and phosphoric acid, to control the pH level, when nitrogen sources are used which liberate acid ions in the culture broth.

10. A process as claimed in claim 1, said carbohydrate materials being selected from a group consisting of glucose, sucrose, fructose, molasses and starch hydrolyzate, with a maximum concentration of about 30 percent.

11. A process as claimed in claim 1, said nitrogen sources being selected from a group consisting of ammonium chloride, ammonium sulfate, ammonium phosphate, ammonium liquid, ammonium tartrate, sodium nitrate and urea, corn steep liquor, peptone, yeast extract, meat extract and casein hydrolyzates, with a maximum concentration of about 0.02 to 0.5 g. per liter of culture medium.

12. A process as claimed in claim 1, further comprising the step of adding to the medium inorganic salts, selected from the group consisting of acidic potassium phosphate, magnesium sulfate, ferrous sulfate and zinc sulfate, are also added to the nutrient culture medium in suitable amounts.

* * * * *